R. STOCK.
SECTIONAL RIM FOR VEHICLE WHEEL TIRES.
APPLICATION FILED MAY 23, 1919.

1,436,829.  Patented Nov. 28, 1922.

Inventor:
Robert Stock
by attorneys

Patented Nov. 28, 1922.

1,436,829

UNITED STATES PATENT OFFICE.

ROBERT STOCK, OF SANDUSKY, OHIO.

SECTIONAL RIM FOR VEHICLE WHEEL TIRES.

Application filed May 23, 1919. Serial No. 299,275.

*To all whom it may concern:*

Be it known that I, ROBERT STOCK, a citizen of the United States, and resident of Sandusky, in the county of Erie and State of Ohio, have invented a new and useful Improvement in Sectional Rims for Vehicle Wheel Tires, of which the following is a specification.

The object of this invention is to provide a radially expansible and contractible sectional rim which can be conveniently used with a single tube pneumatic tire.

A further object is to provide a rim of the character described, which will be strong, durable and easy to manipulate.

Figure 1:
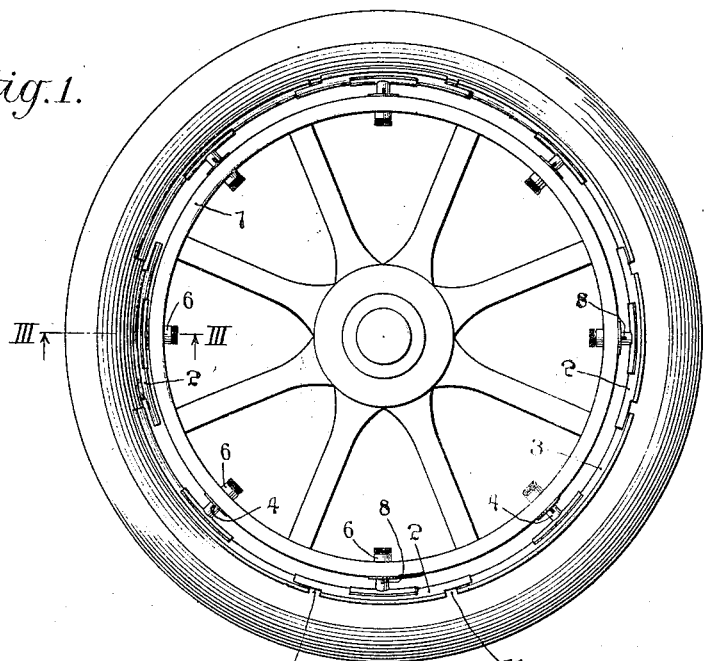
Figure 2:
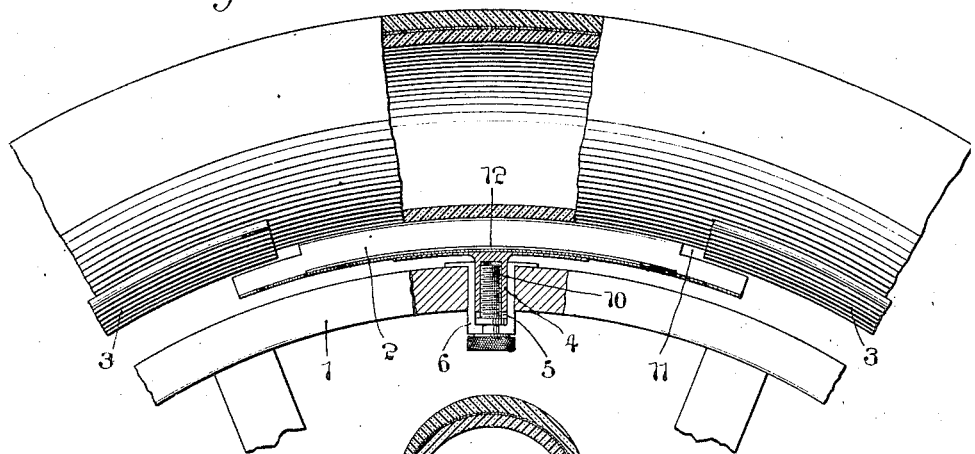
Figure 3:
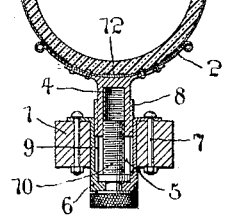

A practical embodiment of my invention is represented in the accompanying drawings, in which Fig. 1 represents a side elevation of a vehicle wheel with the rim attached and a tire mounted thereon, Fig. 2 represents a side elevation partly in section of a portion of the felly, rim and tire, and Fig. 3 represents a vertical section taken in the plane of the line III—III of Fig. 1, looking in the direction of the arrows.

The felly of the wheel is denoted by 1; the smaller rim sections by 2 and the larger rim sections by 3. Each rim section carries an internally threaded shank 4 which is fitted to enter a slot 5 formed within a flanged thimble 6 which extends through an opening in the felly and is fastened thereto by bolts 7 passing through the flange and the felly. The shank 4 is adapted to slide within the thimble 6 and a tongue 8 carried by said shank coacts with a groove 9 in the thimble to prevent rotation of the shank therein.

In the inner end of the thimble 6 is rotatably mounted, against radial movement, a screw bolt 10 which cooperates with the shank 4 to move a section of the rim toward or away from the felly in a radial direction.

The shorter rim sections 2, which, if desired, may be made slightly heavier than the longer sections 3, overlap the sections 3 on the side adjacent to the felly and are cut away, as shown at 11, so as to permit the sections to lie flat upon each other. The concave surface of one or more of the rim sections is roughened, as shown clearly at 12, (Fig. 2), to assist in preventing the tire from creeping on the rim.

The rim is particularly adapted for use with a single tube tire, annular in cross section, which is inflated before it is placed on the rim. In order to place the tire on the rim, the rim sections are drawn in toward the felly 1 by turning the bolts 10. This will so contract the periphery of the rim that the tire can be easily placed thereon. The rim sections are then forced outwardly until the tire is firmly held in the rim channel.

It will be seen that the rim will have a certain amount of elasticity due to the fact that the overlapping rim sections are free to slide to a certain extent upon each other. Thus, the rim, while sufficiently firm and rigid, will have sufficient elasticity to aid it in resisting sudden shocks and strains to which it is subjected in use.

It will be understood that various changes may be resorted to in the form, construction and operation of the several parts without departing from the spirit and scope of my invention; and hence I do not intend to be limited to the specific details set forth except as they may be included in the claims.

What I claim is:—

1. A sectional rim for vehicle wheel tires comprising a plurality of rim sections, certain of said sections being cut away to overlap the adjacent sections, and means for moving one of the rim sections into and out of engagement with the tire.

2. A sectional rim for vehicle wheel tires comprising a plurality of rim sections, certain of said sections being cut away to overlap the adjacent sections, and radially operated means carried by the felly for moving the rim sections independently into and out of engagement with the tire.

3. A sectional rim for vehicle wheel tires comprising a plurality of rim sections, certain of said sections being cut away to overlap the adjacent sections, and radially operated means carried by and slidable in the felly for moving the rim sections independently into and out of engagement with the tire.

4. A sectional rim for vehicle wheel tires comprising a plurality of rim sections, certain of said sections being cut away to overlap the adjacent sections, and means including an internally threaded shank carried by each rim section and an externally threaded screw bolt carried by the felly arranged to coact with said internally threaded shank for moving the rim sections radially into and out of engagement with the tire.

5. A sectional rim for vehicle wheel tires comprising a plurality of rim sections, certain of said sections being cut away to overlap the adjacent sections, and means including an internally threaded shank carried by the rim section and slidably mounted in the felly and an externally threaded screw bolt carried by the felly arranged to coact with said internally threaded shank for moving the rim sections radially into and out of engagement with the tire.

In testimony, that I claim the foregoing as my invention, I have signed my name this 25th day of June 1917.

ROBERT STOCK.